United States Patent [19]

Prucnal

[11] 4,293,398

[45] Oct. 6, 1981

[54] PROCESS FOR CATHODICALLY ELECTRODEPOSITING POLYMERS HAVING TERTIARY AMINE OXIDE GROUPS

[75] Inventor: Paul J. Prucnal, Monroeville, Pa.

[73] Assignee: PPG Industries, Inc., Pittsburgh, Pa.

[21] Appl. No.: 199,754

[22] Filed: Oct. 23, 1980

Related U.S. Application Data

[63] Continuation-in-part of Ser. No. 8,297, Feb. 1, 1979, abandoned.

[51] Int. Cl.$^3$ .............................................. C25D 13/06
[52] U.S. Cl. .................................................. 204/181 C
[58] Field of Search .................................... 204/181 C

[56] References Cited

U.S. PATENT DOCUMENTS

| | | | |
|---|---|---|---|
| 2,747,349 | 6/1956 | Cislak | 260/290 |
| 3,928,156 | 12/1975 | Wismer et al. | 204/181 C |
| 4,055,517 | 10/1977 | Daimer | 260/29.2 EP |
| 4,069,183 | 1/1978 | Daimer | 260/29.2 EP |
| 4,076,676 | 2/1978 | Sommerfeld | 260/29.2 EP |
| 4,081,341 | 3/1978 | Christenson et al. | 204/181 C |
| 4,102,863 | 7/1978 | Buchwalter et al. | 528/111 |
| 4,171,293 | 10/1979 | Eschwey et al. | 260/22 A |

FOREIGN PATENT DOCUMENTS

| | | |
|---|---|---|
| 2753861 | 6/1978 | Fed. Rep. of Germany . |
| 7510125 | 3/1976 | Netherlands . |

*Primary Examiner*—Howard S. Williams
*Attorney, Agent, or Firm*—George D. Morris

[57] ABSTRACT

Polymer having tertiary amine oxide groups may be cathodically electrodeposited from aqueous electrodeposition baths.

2 Claims, No Drawings

PROCESS FOR CATHODICALLY ELECTRODEPOSITING POLYMERS HAVING TERTIARY AMINE OXIDE GROUPS

CROSS-REFERENCE TO RELATED APPLICATIONS

This application is a continuation-in-part of application Ser. No. 8,297, filed Feb. 1, 1979, now abandoned.

Electrodeposition as a coating application method involves the deposition of a film-forming material under the influence of an applied electrical potential and has become of increasing commercial importance. Along with the increased use of such methods has been the development of various compositions which provide more or less satisfactory coatings when applied in this manner. However, most conventional coating techniques do not produce commercially usable coatings, and electrodeposition of many coating materials, even when otherwise successful, is often attended by various disadvantages such as non-uniform coatings and by poor throw power, i.e., the ability to coat areas of the electrode which are remote or shielded from the other electrode. In addition, the coatings obtained are in many instances deficient in certain properties essential for the utilization in certain applications for which electrodeposition is otherwise suited. In particular, properties such as corrosion resistance and alkali resistance are difficult to achieve with the resins conventionally employed in electrodeposition processes, and many electrodeposited coatings are subject to discoloration or staining because of chemical changes associated with electrolytic phenomena at the electrodes and with the types of resinous materials ordinarily utilized. This is especially true with the conventional resin vehicles used in electrodeposition processes which contain polycarboxylic acid resins neutralized with a base; these deposit on the anode and because of their acidic nature tend to be sensitive to common types of corrosive attack, e.g., by salt, alkali, etc. Further, anodic deposition tends to place the uncured coating in proximity to metal ions evolved at the anode, thereby causing staining with many coating systems.

It has now been found that a conductive substrate serving as a cathode may be electrocoated by passing an electric current between an anode and the cathode in electrical contact with a water-dispersed composition which comprises a cathodically electrodepositable polymer having tertiary amine oxide groups.

The water-dispersed polymer used in the present invention may be substantially any polymer which has tertiary amine oxide groups and which is cathodically electrodepositable. The backbone of such polymers is generally linear. Branching, if present, should not be in such quantity as will seriously interfere with the ability of the polymer to electrodeposit on the cathode. Exemplary polymers suitable for use in the instant invention are acrylic polymers, epoxy polymers, polyester polymers, polyurethane polymers, polyamide polymers and hybrid polymers such as poly(urethaneamide) polymers. Mixtures of polymers may be employed.

The polymers of the invention may be prepared by reacting precursor polymers having a plurality of tertiary amine groups with hydrogen peroxide, a peracid or ozone. The tertiary amine groups may be in the polymeric backbone itself, they may be distributed along the polymer as substituents or in short sidechains, they may be located in one or more terminal positions or any combination of these forms may be present.

Although it is not desired to be bound by any theory it is believed that the oxidation of tertiary amine proceeds along the following lines:

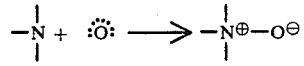

It may be that the resulting tertiary amine oxide group accepts a proton from a proton donor, such as water, organic acid or mineral acid, which is present in the reaction mixture:

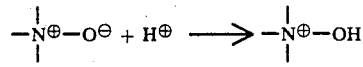

As used throughout the specification and claims "tertiary amine oxide group" is intended to include tertiary amine oxide whether or not protonated, unless otherwise qualified either expressly or contextually.

Preparation of polymers containing tertiary amine groups is well known in the art. The tertiary amine groups may be introduced during formation of the polymer, they may be introduced after polymer formation or both of these.

Examples of acrylic polymers which may be employed in preparing tertiary amine oxide polymers of this invention include interpolymers of alkyl ester of acrylic acid, alkyl ester of methacrylic acid or a mixture of such esters, one or more tertiary nitrogen compounds containing alpha, beta ethylenic unsaturation, and usually, but not necessarily, one or more other interpolymerizable ethylenically unsaturated monomers.

Examples of alkyl esters that may be employed include such alkyl acrylates and methacrylates as ethyl, methyl, propyl, butyl, hexyl, ethylhexyl and lauryl acrylates and methacrylates, as well as similar esters having up to about 20 carbon atoms in the alkyl group. Also, hydroxyalkyl esters can readily be employed. Examples of such hydroxyalkyl esters include 2-hydroxyethyl acrylate, 2-hydroxypropyl acrylate, 2-hydroxypropyl acrylate, 2-hydroxyethyl methacrylate, 2-hydroxypropyl methacrylate, 3-hydroxypropyl-4-hydroxybutyl methacrylate, and mixtures of such esters having up to about 5 carbon atoms in the alkyl group. In some instances, corresponding esters of other unsaturated acid, for example, ethacrylic acid, crotonic acid, and other similar acids having up to about 6 carbon atoms can be employed.

The tertiary nitrogen compounds containing alpha, beta ethylenic unsaturation include the (dialkylamino)alkyl acrylates and the (dialkylamino)alkyl methacrylates, the (dialkylamino)alkyl acrylamides and the (dialkylamino) alkyl methacrylamides. Usually the alkyl radical which is substituted with dialkylamino contains from about 1 to about 6 carbon atoms. Each N-alkyl radical generally independently contain from about 1 to about 4 carbon atoms. Also, monomers wherein the vinyl group is attached to the following radicals include 2H-pyrrolyl, pyrrolyl, imidazolyl, pyrazolyl, pyridyl, pyrazinyl, pyrimidinyl, and the like are generally employed. Examples of such monomers include three monomers that have been found to be particularly useful in producing the acrylic polymers utilized herein are N,N-dimethylaminoethyl methacrylate, (N,N-dimethylamino)propyl methacrylamide and N-vinylimidazole.

Some examples of additional copolymerizable ethylenically unsaturated monomers that may be employed include monoolefinic and diolefinic hydrocarbons, such as styrene, alpha-methyl styrene, vinyl toluene, isobutylene, 2,3-dimethyl hexane-1, butadiene-1,3 and the like; halogenated monoolefinic and diolefinic hydrocarbons such as alpha-chlorostyrene, alpha-bromostyrene, parafluorostyrene, chloroethylene, chlorobutadiene and other halogenated diolefinic compounds; esters of organic and inorganic acids, such as vinyl acetate, vinyl propionate, isopropenyl acetate, vinyl chloride, allyl chloride, vinyl alpha-chloroacetate, dimethyl maleate and the like; organic nitriles such as acrylonitrile, methacrylonitrile, ethacrylonitrile, crotonitrile and the like.

The above polymerizable monomers are mentioned as representative of the

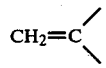

containing monomers which may be employed; essentially any such copolymerizable monomer can be used.

Examples of epoxy polymers which may be employed in preparing tertiary amine oxide polymers of this invention include polymeric materials containing two or more epoxy groups per molecule, and preferably two per molecule. The polyepoxides are of relatively high molecular weight having molecular weights of at least 350, preferably within the range of 350 to 2000. The polyepoxides can be essentially any of the well-known types such as polyglycidyl ethers of polyphenols, for example, bisphenols such as Bisphenol A. These can be produced by etherification of a polyphenol with epihalohydrin in the presence of alkali. The phenolic compound may be bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxytertiarybutyl-phenyl)-2,2-propane, bis(2-hydroxynaphthyl)methane, 1,5-dihydroxynaphthalene, or the like. In many instances, it is desirable to employ such polyepoxides having higher molecular weights and containing aromatic groups. This can be provided by reacting the diglycidyl ether above with a polyphenol such as Bisphenol A, and then further reacting this product with epichlorohydrin to produce a polyglycidyl ether.

Another quite useful class of polyepoxides are polyglycidyl ethers of phenolic novolak resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like.

There can also be used polyglycidyl esters of polycarboxylic acids.

Other useful epoxy-containing compounds and resins include nitrogenous diepoxides such as disclosed in U.S. Pat. No. 3,365,471, the disclosure of which is incorporated herein by reference; epoxy resins from 1,1-methylene bis(5-substituted hydantoin) such as disclosed in U.S. Pat. No. 3,391,097, the disclosure of which is incorporated herein by reference; N,N'-diglycidyl-5,5-dimethylhydantoin; bis-imide containing diepoxides such as disclosed in U.S. Pat. No. 3,450,711, the disclosure of which is incorporated herein by reference; epoxylated aminomethyl diphenyl oxides such as disclosed in U.S. Pat. No. 3,312,664, the disclosure of which is incorporated herein by reference; heterocyclic N,N'-diglycidyl compounds such as disclosed in U.S. Pat. No. 3,503,979, the disclosure of which is incorporated herein by reference; amino epoxy phosphonates, such as disclosed in British patent specification No. 1,172,916, the disclosure of which is incorporated herein by reference; 1,3,5-triglycidyl isocyanurates, as well as other epoxy-containing materials known in the art.

The polyglycidyl ethers of polyphenols are the preferred polyepoxides for use in the practice of the present invention. Preferred polyglycidyl ethers of polyphenols have molecular weights of at least 350, preferably within the range of 350 to 2000, and epoxy equivalents within the range of 180 to 1000.

The polymeric polyepoxides described can be reacted with the organic polyols to chain extend and increase the molecular weight of the polymeric polyepoxides. The chain extender in effect acts as a chemical bridge between the lower molecular weight polymer chains bridging them together to produce advanced or higher molecular weight products. Usually bridging is done between terminal epoxy groups in the polymer chains. Reaction occurs by the alcoholic primary hydroxyls opening the epoxide ring forming an ether linkage and a secondary hydroxyl group.

In general, in the practice of preparing resins of the present invention which are suitable for use in electrodeposition, about 0.1 to about 0.8 equivalent of organic polyol per equivalent of epoxy group is usually used. Also, the production of essentially linear polymers is preferred. Thus, difunctional polyols should be used. Linear polymers are produced through reactions of diepoxides and difunctional organic polyols.

Examples of polyester polymers which may be employed are those prepared from a polyol and a polycarboxylic acid and/or acid anhydride by techniques that are well-known in the esterification or alkyd resin art. The polyester may be either saturated or unsaturated.

The polyester produced can be prepared from those polyols utilized in the preparation of conventional polyesters. Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, tetramethylene glycol, 2,3-dihydroxybutane, 1,4-dihydroxybutane, 1,4-dihydroxy-2-ethyl butane, 1,6-dihydroxyhexane, 1,3-dihydroxyoctane, 2,10-dihydroxydecane, 2,2-diethylpropanediol-1,3, 2,2-diethylbutanediol-1,3, 4,5-dihydroxynonane, pentamethylene glycol, heptamethylene glycol, decamethylene glycol, butene-2-diol-1,4, 2,7-dihydroxy-n-hexane-4, 2-ethylhexanediol-1,3, glycerol, 1,2,6-hexanetriol, pentaerythritol, sorbitol, mannitol, methyl glycoside, 2,2-bis(hydroxyethoxyphenyl)propane, 2,2-bis(betahydroxypropoxyphenyl) propane, 2-hydroxyethylhydroxyacetate, 1,1-bi(hydroxymethyl)nitroethane, and the like. Mono-functional alcohols may also be employed to supplement the polyols if desired. For example, more flexible polyesters are provided by employing a small amount of mono-functional alcohols to replace part of the more functional polyols. Useful alcohols include those having a carbon chain comprising from about 3 to about 18 carbon atoms. Those useful alcohols include primary, secondary, and tertiary alcohols, such as methanol, ethanol, propanol, isopropanol, 1-butanol, 2-butanol, tertbutanol, 1-pentanol, 3-pentanol, tert-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohol such as cyclohexanol and trimethylcyclohexanol.

Particularly useful polyols include diols and triols. Generally, the diol component includes glycols of the formula $HO(CH_2)_nOH$ wherein n equals 2 to 10, glycols of the formulas $HO(CH_2CH_2O)_nH$ and $HO[CH(CH_3)CH_2O]_nH$ in which n equals 1 to 10, such as ethylene glycol, diethylene glycol, and the like, 2,2-dimethyl-1,3-propanediol, 2,2-diethyl-1,3-propanediol, 2,2-diethyl-1,3-propanediol, 3-methyl-1,5-pentanediol, N-methyl and N-ethyl diethanolamines. Others include 4,4'-methylenebiscyclohexanol, 4,4'-isopropylidenebiscyclohexanol and various xylenediols, hydroxymethylphenylethyl alcohols, hydroxymethylphenylpropanols, phenylenediethanols, phenylenedipropanols and heterocyclic diols such as 1,4-piperazine diethanol and the like. Some of the preferred diols include 2-methyl-2-ethyl-1,3-propanediol, 2-ethyl-1,3-hexanediol and 2,2-dimethyl-3-hydroxypropyl, 2,2-dimethyl-hydroxypropionate and the like. The preferred triols (tri-functional polyols) are trimethylolpropane; trimethylolethane, 1,2,3-propanetriol; 1,2,4-butanetriol; 1,2,6-hexanetriol; and the like.

Illustrative of the various polycarboxylic acids that can be employed to react with the polyol include a variety of dicarboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, maleic acid, fumaric acid, aconitic acid, itaconic acid, citraconic acid, mesaconic acid, muconic acid and glutaconic acid. Anhydrides of these acids, where they exist, can be employed. Not only may single acids or anhydrides be used, but mixtures of acids, mixtures of anhydrides or mixtures of acids and anhydrides may be employed.

Minor amounts of tricarboxylic acids or acids of higher carboxylic functionality may be employed.

Monocarboxylic acids may also be used to supplement the polycarboxylic acids if desired. Usually such acids are saturated, such as acetic acid, propionic acid, butyric acid, valeric acid, caproic acid, enanthic acid, caprylic acid, pelargonic acid, capric acid, undecylic acid, lauric acid, myristic acid, palmitic acid, stearic acid, 3,4-dimethylpentanoic acid and dimethylacetic acid, however, unsaturated monocarboxylic acids such as acrylic acid, methacrylic acid, ethacrylic acid, crotonic acid, isocrotonic acid, tiglic acid, angelic acid, cinnamic acid, oleic acid, ricinoleic acid, vinylacetic acid, erucic acid, sorbic acid, linoleic acid and linolenic acid may be used.

Hydroxy substituted carboxylic acids are also useful. Examples of these include glycolic acid, lactic acid, beta-hydroxybutyric acid, gluconic acid, tartaric acid, malic acid, tartronic acid, saccharic acid, citric acid, 9,10-dihydroxystearic acid, 12-hydroxystearic acid, ricinoleic acid, dimethylolpropionic acid and the like.

For purposes of the present invention, the aromatic nuclei of aromatic acids such as phthalic acid are generally regarded as saturated since the double bonds do not ordinarily react by addition as do ethylenic groups. Therefore, wherever the term "saturated" is utilized, it is to be understood that such term includes aromatic unsaturation or other form of unsaturation which does not react by addition, unless otherwise qualified.

The polyurethanes comprise another class of resins which may be used in the invention. Essentially the polyurethanes are condensation products of a polyisocyanate and a compound having at least two reactive hydrogen atoms, i.e., hydrogen atoms determinable by the Zerewitinoff method.

Examples of useful active hydrogen-containing compounds include polyesters prepared from polycarboxylic acids and polyhydric alcohols, polyhydric polyalkylene ethers having at least two hydroxy groups, polythioether glycols, polyester amides, etc.

The polyesters of polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1, 4-dicarboxylic, polyacrylic, naphthalene-1,2-dicarboxylic, fumaric, itaconic, etc., acids, with polyalcohols, such as ethylene glycol, diethylene glycol, pentaglycol, glycerol, sorbitol, triethanolamine, di-(beta-hydroxyethyl)ether, etc., and/or amino-alcohols such as ethanolamine, 3-aminopropanol, 5-aminopentanol-1, 10-aminodecanol, 6-amino-5-methylhexanol-1, p-hydroxymethylbenzylamine, etc., and with mixtures of the above polyalcohols and amines, ethylenediamine, 3-methylhexamethylenediamine, decamethylenediamine and m-phenylenediamine, etc., and/or amino-alcohols, etc. In the esterification or amide formation the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol, 2-methylpentanediol-2,4, 2-ethylhexanediol-1,3, hexamethylene glycol, styrene glycol, diethylene glycol, tetraethylene glycol, polythioethylene glycol, polyethylene glycols 200, 400, 600, etc., dipropylene glycol, tripropylene glycol, trithiopropylene glycol, polypropylene glycols 400, 750, 1200, 2000, etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, propylene-1,2-diisocyanate, cyclohexylene diisocyanate, m-phenylene diisocyanate, 2,4-tolylene diisocyanate, 3,3'-dimethoxy-4,4'-biphenylene diisocyanate, 3,3'-dichloro-4, 4'-biphenylene diisocyanate, triphenylmethane triisocyanate, 1,5-naphthalene diisocyanate, hydrogenated toluene diisocyanate, methylene bis(cyclohexylisocyanate), isophorone diisocyanate, trimethylhexamethylene diisocyanate, lysine diisocyanate methyl ester or polyisocyanates in a blocked or inactive form, such as the bisphenyl carbonates of tolylene diisocyanate and 1,5-naphthalene diisocyanate, etc.

Tertiary amine groups may be introduced into the polymer by any of the methods known in the art. For example, monomers containing tertiary amine groups may be used in preparing the polymer. This is illustrated above in discussing the formation of acrylic polymers. Tertiary amine groups may be introduced during a chain extending reaction. For example an epoxide resin may be chain extended with a primary amine to thereby introduce tertiary amine groups. An isocyanato terminated prepolymer may be reacted with a tertiary dialkanolamine, such as methyldiethanolamine to introduce tertiary amine groups. Tertiary amine groups may be introduced into the terminal positions of a polymer. For example, an epoxide polymer may be reacted with a secondary amine to introduce tertiary amine groups. An isocyanato terminated polyurethane prepolymer may be reacted with a tertiary alkanolamine, such as dimethylethanolamine, to introduce tertiary amine groups in the terminal positions. Similarly, a carboxyl terminated polyester may be reacted with a tertiary alkanolamine, such as dimethylethanolamine to introduce tertiary amine groups in the terminal positions. Tertiary amine groups may be introduced by reacting tertiary amine compounds containing a functional group which is capable of reacting with a complimentary group attached to the polymer. This method may be used to introduce tertiary amine groups along the backbone, in the terminal positions or both of these. For example, a polymer containing pendent epoxide groups may be reacted with a secondary amine; pendent carboxyl groups may be reacted with a tertiary alkanolamine, or pendent hydroxyl groups may be reacted with the product obtained by reacting one molar part of an organic diisocyanate with one molar part of a dialkylaminoalkyl amine.

The amount of tertiary amine groups contained in the polymer prior to oxidation is subject to wide variation. Sufficient tertiary amine groups should be present so that when some or all of them are oxidized to tertiary amine oxide, the polymer will be soluble enough in water to electrodeposit at the cathode, yet not so soluble that it dissolves as rapidly as it is electrodeposited. The presence or absence of other water-solubilizing groups and the nature of the polymer itself affects the amount of tertiary amine groups needed. Usually, however, the polymer prior to oxidation contains from about 0.01 to about 3 gram-moles of tertiary amino nitrogen per 1000 grams of the polymer. From about 0.05 to about 2 gram-moles per 1000 grams of polymer is typical. From about 0.1 to about 1.5 gram-moles of tertiary amino nitrogen per 1000 grams of the polymer is preferred.

Oxidation of some or all of the tertiary amine groups present in the polymer may be accomplished by reacting them with hydrogen peroxide, ozone or a peracid such as peracetic acid or perbenzoic acid. The temperature of the reaction may vary widely, but ambient temperatures or slightly elevated temperatures are usually employed. Typically, the reaction temperature is in the range of from about 0° C. to about 130° C. Usually, the reaction temperature is in the range of from about 20° C. to about 105° C.

The number of tertiary amine oxide groups present in the polymer is also subject to wide variation. Sufficient tertiary amine oxide groups should be present so that the polymer will have the requisite solubility in water as discussed above. The presence or absence of other water-solubilizing groups and the nature of the polymer itself affects the amount of tertiary amine oxide groups needed. Typically the polymer contains from about 0.01 to about 1.4 gram-moles of tertiary amine oxide, taken as

per 1000 grams of the polymer. From about 0.05 to about 1.3 gram-moles of tertiary amine oxide groups per 1000 grams of the polymer is usually present. From about 0.1 to about 0.4 gram-moles of tertiary amine oxide groups per 1000 grams of the polymer is preferred.

The cathodically electrodepositable polymer having tertiary amine oxide groups present may also optionally have amino nitrogen groups present. These amino nitrogen groups may be primary, secondary, or tertiary amino nitrogen groups. Mixtures of such groups may be present. The amino nitrogen groups may be introduced into the polymer by any of the methods known to the art. When used, such amino nitrogen groups are generally present in the polymer in an amount in the range of from about 0.1 to about 4 gram-moles of amino nitrogen groups per 1000 grams of polymer. Typically they are present in an amount in the range of from about 0.5 to about 3 gram-moles of amino nitrogen groups per 1000 grams of the polymer. From about 1 to about 2 gram-moles of amino nitrogen groups per 1000 grams of polymer is preferred. All, none or a portion of the amino nitrogen groups may be protonated. Generally, such protonated amino nitrogen groups are formed by protonation of amino nitrogen groups by one or more acids. Examples of acids that may be utilized include (a) inorganic acids such as carbonic, phosphoric, sulfuric, and the like; (b) aliphatic acids such as formic, acetic, lactic, propionic, butyric, glycolic, isobutyric, transcrotonic, malonic, and the like; and (c) aromatic acids such as benzoic, m-nitrobenzoic, o-phthalic, o-toluic, m-toluic, o-phenylenediacetic, o-chlorobenzoic, gallic, phenylacetic, trans-cinnamic, p-toluic, o-iodobenzoic, and the like. The acids set forth above are not intended to be all inclusive, but are only to be considered as representative of many other similar acids which may readily be employed. Usually protonation is accomplished by organic carboxylic acid, carbonic acid or mixtures thereof.

In the tertiary amine oxide-containing polymer also having amino nitrogen groups, it is preferred that a portion of the amino nitrogen groups be protonated and a portion of the amino nitrogen groups be non-protonated. Typically, protonated amino nitrogen groups are present in the polymer in an amount in the range of from about 0.05 to about 3.95 gram-moles of protonated amino nitrogen groups per 1000 grams of the polymer and the non-protonated amino nitrogen groups are present in the polymer in an amount in the range of from about 0.05 to about 3.95 gram-moles of non-protonated amino nitrogen groups per 1000 grams of the polymer. It is preferred that the protonated amino groups are present in the polymer in an amount in the range of from about 0.25 to about 2.75 gram-moles of protonated amino nitrogen groups per 1000 grams of the polymer and that the non-protonated amino nitrogen groups are present in the polymer in an amount in the range of from about 0.25 to about 2.75 gram-moles of non-protonated amino nitrogen groups per 1000 grams of the polymer. Accordingly, the amount of acid employed is typically such that it provides to the system from about 0.05 to about 3.95 gram-moles of acid groups per 1000 grams of the polymer. From about 0.25 to about 2.75 gram-moles of acid groups per 1000 grams of the polymer. Usually the acid groups are carboxyl groups.

Electrodepositable polymers, while referred to as "solubilized", in fact are considered to be in a complex solution, dispersion or suspension or combination of one or more of these classes in water, and acts as an electrolyte under the influence of an electric current. While, no doubt, in some circumstances the binder resin is in solution, it is clear that in some instances, and perhaps in most, the binder resin is distributed in a dispersion and has particle sizes intermediate between those of a colloidal suspension and those of a true solution.

Usually the binder is present in the electrodeposition bath in an amount in the range of from about 0.6 percent to about 40 percent by weight of the bath. Typically, the binder is present in an amount in the range of from about 5 percent to about 30 percent by weight of the bath.

Inasmuch as the total solids concentration of electrodeposition baths is relatively low compared with that of most other coating compositions, it is generally customary to supply a concentrate for further dilution at the point of use to form the aqueous electrodeposition bath. Among the materials usually admixed with the concentrate are water organic acid, organic solvents such as 2-ethoxyethanol or 2-butoxyethanol and various pigment pastes. Ordinarily, the binder is present in the concentrate in an amount in the range of from about 10 percent to about 60 percent by weight of the concentrate. Typically the binder is present in an amount in the range of from about 15 percent to about 40 percent by weight of the concentrate.

Some or all of the vehicle resin of the electrodeposition bath may be the water dispersible, cathodically electrodepositable polymer having tertiary amine oxide groups. Other water dispersible, cathodically electrodepositable polymer may also be present. Usually the cathodically electrodepositable polymer having tertiary amine oxide groups is present in the binder of the electrodeposition bath or of the concentrate in an amount in the range of from about 5 percent to 100 percent by weight of the binder. When the binder of the electrodeposition bath or of the concentrate also contains a crosslinking agent, the cathodically electrodepositable polymer having tertiary amine oxide groups is normally present in an amount in the range of from about 10 to about 95 percent by weight of the binder. Whether the binder does or does not contain a crosslinking agent, it is preferred that the polymer having tertiary amine oxide groups is present in an amount in the range of from about 40 percent to about 80 percent by weight of the binder.

When the cathodically electrodepositable polymer having tertiary amine oxide groups is thermosettable, it may be autothermosetting or it may be formulated with one or more crosslinking agents which react with functional groups of the polymer. An example of an autothermosetting polymer is an acrylic polymer having interpolymerized therein N-(butoxymetyl) acrylamide.

There are many methods of crosslinking polymers with crosslinking agents. Some depend on the cure of a carboxyl-containing interpolymer with diglycidyl compounds or glycidyl containing polymers with various carboxyl or amine curing agents. Others are dependent on hydroxyl-containing polymers being cured with aminoplast resins. Still others depend upon reaction between blocked isocyanato groups with hydroxyl groups or by addition polymerization between ethylenically unsaturated groups.

When present, crosslinking agent generally constitutes from about 5 to about 60 percent by weight of the binder. From about 20 percent to about 40 percent by weight of the binder is preferred.

Examples of suitable aminoplast crosslinking agents are the hexamethyl ether of hexamethylolmelamine, and triethyl trimethyl ether of hexamethylolmelamine, the hexabutyl ether of hexamethylolmelamine and the hexaethyl ether of hexamethylolmelamine and polymeric butylated melamine formaldehyde resins.

Urea-aldehyde crosslinking agents may be prepared by reacting a urea and an aldehyde to the resol stage and thereafter alkylating with an alcohol under acidic conditions to provide an alkylated urea-aldehyde resin. An example of a suitable urea-aldehyde crosslinking agent is butylated urea-formaldehyde resin.

The blocked polyisocyanate which may be employed as the crosslinking agent may be any polyisocyanate where the isocyanate groups have been reacted with a compound so that the resultant blocked polyisocyanate is stable to hydroxyl groups at room temperature but reactive with hydroxyl groups at elevated temperatures, usually in the range of from about 90° C. to about 300° C. In the preparation of the blocked polyisocyanate, any suitable organic polyisocyanate may be used. The diisocyanates used usually contain from about 3 to about 36 carbon atoms. Generally, the diisocyanate contains from about 8 to about 15 carbon atoms. Examples of suitable diisocyanates include trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenylether and 2,3-bis(8-isocyanatooctyl)-4-octyl-5-hexylcyclohexene. Polyisocyanates of higher isocyanate functionality may be used. Examples of these are tris(4-isocyanatophenyl)methane, 1,3,5-triisocyanatobenzene, 2,4,6-triisocyanatotoluene, 1,3,5-tris(6-isocyanatohexyl)biuret, bis(2,5-diisocyanato-4-methylphenyl)methane and polymerized polyisocyanates such as diisocyanatotoluene dimers and trimers and the like. Mixtures of polyisocyanates may be used when desired.

In addition, the organic polyisocyanate may be prepolymer derived from a polyol including polyether polyol or polyester polyol, including polyethers which are reacted with excess polyisocyanates to form isocyanate terminated prepolymers may be simple polyols such as glycols, e.g., ethylene glycol and propylene glycol, as well as other polyols such as glycerol, trimethylolpropane, hexanetriol, pentaerythritol, and the like, as well as monoethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butanediol, 1,3-butanediol, 1,6-hexanediol, and their mixtures; glycerol, trimethylolethane, trimethylpropane, 1,2,6-hexanetriol, polypentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic or aromatic alkyl monoalcohol may be used as a blocking agent in accordance with the present invention, such as, for example, aliphatic alcohols, such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols such as, for example, cyclopentanol, cyclohexanol, and the like, the aromatic-alkyl alcohols, such as phenylcarbinol, methylphenylcarbinol, and the like. Minor amounts of even higher molecular weight relatively non-volatile monoalcohols may be used, if desired, to serve as plasticizers in the coatings provided by this invention.

Additional blocking agents include hydroxyl amines such as ethanolamine and oximes such as methyl ethyl ketone oxime, acetone oxime and cyclohexanone oxime.

The organic polyisocyanate-blocking agent adduct is formed by reacting a sufficient quantity of alcohol with the organic polyisocyanate to insure that no free isocyanate groups are present. The reaction between the organic polyisocyanate and the blocking agent is exothermic; therefore, the polyisocyanate and the blocking agent are preferably admixed at temperatures no higher than 80° C. and, preferably, below 50° C. to minimize the exotherm effect.

There may be present in the electrodepositable composition any of the conventional types of pigments employed in the art. There is often incorporated into the pigment composition a dispersing or surface-active agent. Usually the pigment and surface-active agent, if any, are ground together in a portion of the vehicle, or alone, to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methylpentanone-2 (Pent-Oxone; Shell Chemical Company).

There may also be included in the coating composition, if desired, additives such as antioxidants. For example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypoly-ethylene alkanols, or phosphate esters including ethoxylated alkylphenol phosphates. Other additives which may be employed include antifoaming agents, suspending agents, bactericides, and the like.

In formulating the coating composition, ordinary tap water may be employed. However, such water may contain a relatively high level of metals and cations which, while not rendering the process inoperative, may result in variations of properties of the baths when used in electrodeposition. Thus, in common practice, deionized water, i.e., water which has been passed through an ion exchange column where metallic cations are exchanged for hydrogen ions and through another ion exchange column where various anions are exchanged for hydroxyl ions, is generally used to make up coating compositions of the instant invention.

The listing of optional ingredients discussed above is by no means exhaustive. Other materials known in the art may be added in their customary amounts for their customary purposes so long as they do not seriously interfere with good coatings practice.

Virtually any conductive substrate may be coated by electrodeposition. Those normally employed are metal substrates, including metals such as iron, steel, copper, zinc, brass, tin, nickel, chromium and aluminum, as well as other metals and pretreated metals. Impregnated paper and other substrates rendered conductive under the conditions of the coating process may also be employed as substrates.

In the cationic electrodeposition process, the articles to be electrocoated are immersed in an aqueous dispersion of solubilized, ionized, film-forming materials such as synthetic organic vehicle resin. An electric current is passed between the article to be coated, serving as a cathode, and an anode to cause deposition of a coating of the vehicle resin on the article. The article is then withdrawn from the bath, usually rinsed and then the coating is either air dried or baked in the manner of a conventional finish.

The invention is further described in conjunction with the following examples, which are to be considered illustrative rather than limiting. All parts and percentages in the examples and throughout this specification are by weight unless otherwise specified.

EXAMPLE I

A reactor equipped with a heater, a cooler, an agitator, a thermometer, a condenser set for azeotropic distillation and a source of nitrogen is charged with 880 parts diethylenetriamine and 2563 parts methyl isobutyl ketone. A nitrogen blanket is applied and the heater is turned on. Forty-five minutes later the reaction mixture is refluxing at 93.3° C. Over a period of 5¾ hours as the temperature rises from 93.3° C. to 136.7° C., a total of 312 parts water is removed. The heater is then turned off and the cooler is turned on. Thirty minutes later the temperature is 32.2° C. and the resulting diketimine solution is placed into containers.

A reactor equipped with a heater, a cooler, an agitator, a thermometer, a vent leading to a scrubber and a source of nitrogen is charged with 12,280 parts toluene diisocyanate (viz., a mixture comprising about 80 percent 2,4-tolylene diisocyanate and about 20 percent, 2,6-tolylene diisocyanate). A nitrogen blanket is applied and the cooler is turned on. Over a period of 5 hours 5550.5 parts 2-ethylhexanol is gradually added as the temperature gradually rises to 48.9° C. While holding the temperature at 48.9° C., a further 3649.5 parts 2-ethylhexanol is gradually added over a period of 4 hours. The reaction mixture is held at 48.9° C. for 1¼ hours at which time the cooler is turned off and 3.6 parts dibutyl tin dilaurate is added. The heater is then turned on and the reaction mixture is heated over a period of 45 minutes to 65.6° C. Over a period of 2 hours and 50 minutes 3184 parts 1,1,1-trimethylolpropane is gradually added as the temperature gradually rises from 65.6° C. to 121.1° C. The reaction mixture is held at 121.1° C. for 1½ hours, then 10,560 parts 2-ethoxyethanol is gradually added. The resulting product is a polyurethane curing agent solution.

A reactor equipped with a heater, a cooler, an agitator, a thermometer and a condenser set for total reflux is charged with 806 parts 2-butoxyethanol and heated to 82.2° C. Over a period of 20 minutes while holding the temperature at 82.2° C., 806 parts 1-(2-hydroxyethyl-2-alkylimadazoline) (Amine C; Ciba-Geigy Chemical Corp.) is added. The mixture is then held at 82.2° C. for 5 minutes. Over a period of 35 minutes while holding the mixture at 82.2° C., 806 parts tetramethyldecynediol (Surfynol 104; Air Products & Chemicals Inc.) is added. The mixture is then held at 82.2° C. for 1 hour after which 120 parts acetic acid is added. The mixture is held at 82.2° C. for 1 hour after which 1485 parts deionized water is added. The mixture is then cooled to 48.9° C. and filtered to produce a surfactant solution.

A reactor equipped with a heater, a cooler, an agitator, a thermometer, a condenser set for distillation, a vacuum source and a source of nitrogen is charged with 4400 parts poly-ε-caprolactone-diethylene glycol diol of average formula molecular weight 530 (Niax Polyol PCP-0200; Union Carbide Corporation) and 21,210 parts bisphenol A-diglycidyl ether solution (75 percent resin solids, 25 percent xylene; Epon 1001-X-75; Shell Chemical Company). The heater is turned on and the absolute pressure is reduced to 9.87 kilo Pascals (1 Pascal = 1 newton/square meter). Twenty minutes later the temperature is 77.2° C. and distillation is begun. Over a period of 1 hour and 25 minutes as the temperature rises to 118.9° C., 4590 parts distillate, which is chiefly xylene, is removed. The vacuum is broken with nitrogen. After 2½ hours, when the temperature is 123.9° C., 42 parts benzyldimethylamine is added. Thirty minutes later the temperature is 131.7° C. The temperature is then maintained in the range of from 131.7° C. to 132.2° C. for a period of 2 hours. Thirty minutes later the temperature is 128.9° C. Over a period of 20 minutes 15609 parts of the above polyurethane curing agent solution is added. The reaction mixture is then held at a temperature of 102.8° C. for 10 minutes. Over a period of 10 minutes 1215 parts of the above diketamine solution is added. The reaction mixture is then held at a temperature of 101.1° C. for 5 minutes. Over a period of 20 minutes 972 parts N-methylethanolamine is added. At the end of this period the temperature is 115.6° C. One hour later the temperature of the reaction mixture is 113.9° C. Over a period of 5 minutes 1643 parts 2-hexoxyethanol is added. At the end of this period the temperature is 111.7° C. Fifteen minutes later the temperature is 109.4° C. Over a period of 20 minutes the reaction mixture is discharged into a thinning tank equipped with an agitator, a thermometer and a cooler and containing 30171 parts deionized water, 425 parts glacial acetic acid and 805 parts of the above surfactant solution. At the end of this period the temperature is 53.9° C. The mixture is then agitated for 1 hour. Over a further period of 1 hour 14940 parts deionized water is added. At the end of this period the temperature is 43.3° C. The mixture is filtered into a tank equipped with an agitator. Four hours after completing the previous addition of deionized water, a further 1660 parts deionized water is added to produce an intermediate resin composition.

A nitrogen blanket is applied to a reactor equipped with a cooler, an agitator, a thermometer and a source of nitrogen. The reactor is then charged with 2200 parts 2,4-tolylene diisocyanate and 125 parts methyl isobutyl ketone. The cooler is turned on and while the temperature is held in the range of 26.1° C. to 26.7° C., 1687 parts 2-ethylhexanol is gradually added over a period of 6 hours and 25 minutes. At the end of this period 90 parts methyl isobutyl ketone is added to produce a urethane intermediate.

A reactor equipped with an agitator, a heater, a cooler and a source of nitrogen is charged with 534 parts N,N-dimethylethanolamine. A nitrogen blanket is applied and over a period of 1 hour, 1965 parts of the above urethane intermediate is added. At the end of this period the temperature is 73.9° C. Twenty minutes later the temperature is 75.6° C. and 240 parts 2-butoxyethanol is added. After a further period of 20 minutes, the temperature is 75.6° C. There is then added over a period of 5 minutes 1288 parts of a lactic acid solution consisting of 720 parts lactic acid and 568 parts deionized water. Upon completion of this addition, the temperature is 81.1° C. The heater is turned on and 45 minutes later the temperature is 87.8° C. Over a period of 1½ hours the temperature is increased to 92.2° C. after which the reaction mixture is held at that temperature for 40 minutes. Cooling is applied to reduce the temperature to 48.9° C. The reaction mixture is then filtered to produce a grinding vehicle intermediate.

A reactor equipped with a heater, a cooler, an agitator, a thermometer, a condenser set for distillation and a source of nitrogen is charged with 12,000 parts bisphenol A-diglycidyl ether (Epon 829; Shell Chemical Company) and 4635 parts bisphenol A, viz., 2,2-bis(4-hydroxyphenyl)propane. A nitrogen blanket is applied and the heater is turned on. One hour later, when the temperature is 137.8° C., the heater is turned off. Thirty minutes later the temperature is 176.7° C. After 30 more minutes the temperature is 193.3° C. One hour later the temperature is 165.6° C. After another hour the temperature is 143.3° C. and cooling is applied. One hour later the temperature is 132.2° C. and the gradual addition of 6600 parts of the above urethane intermediate is begun. Thirty minutes later the temperature is 121.1° C. and the addition of the urethane intermediate is completed. The reaction mixture is held at a temperature of 121.1° C. for 1¼ hours after which period 376 parts 2-butoxyethanol is added. The reaction mixture is held at a temperature of 121.1° C. for 15 minutes after which 16161 parts 2-butoxyethanol is added over a period of 30 minutes. At the end of this period the temperature is 87.8° C. The reaction mixture is held at this temperature for 15 minutes after which it is transferred over a period of 15 minutes to a tank equipped with an agitator, a thermometer, a heater and a cooler. Upon completion of the transfer, the temperature is 82.2° C. and the addition of 9188 parts of the above grinding vehicle intermediate and 376 parts 2-butoxyethanol is begun. Thirty minutes later the temperature is 76.7° C. and the additions are completed. The reaction mixture is held at 76.7° C. for 3 hours and then cooled to 65.6° C. Upon attaining this temperature, 564 parts 2-butoxyethanol is added. The reaction mixture is filtered to produce a grinding vehicle composition.

A composition is formed by admixing 223.93 parts of the above grinding vehicle composition, 418.91 parts deionized water and 315.19 parts dibutyl tin oxide. The composition is ground in a zirconia mill to a No. 7 Hegman grind and thereafter filtered to produce a clear paste.

A composition is formed by admixing in order 258 parts of the above grinding vehicle composition, 420.89 parts deionized water, 258 parts aluminum silicate, 45.3 parts lead silicate and 35.12 parts carbon black. The mixture is then ground for 15 minutes using a Cowles dissolver. The Cowles dissolver is then turned off and the mixture is allowed to age for 30 minutes. To the aged mixture is added 22.66 parts strontium chromate. This material is ground in a zirconia mill to a No. 7 Hegman grind. Next, 37.02 parts of the above clear paste is admixed with the ground material. The resulting mixture is filtered to produce a black paste.

A reactor equipped with an agitator, a heater, a thermometer and a total reflux condenser is charged with 744 parts of the above intermediate resin composition and heated to 65° C. Five parts deionized water is then added and the mixture is stirred for 5 minutes. At the end of this period, the temperature is 63° C. and 6.8 parts of 30 percent aqueous hydrogen peroxide solution is added. The reaction mixture is stirred for 15 minutes at the end of which period the temperature is 60° C. The reaction mixture is then allowed to stand for 11 hours and 10 minutes. The reaction mixture is then heated from room temperature to 90° C., then 4.4 parts glacial acetic acid is added and the reaction mixture stirred for 5 minutes. There is then added 442 parts of a mixture consisting of 15 parts of the above surfactant solution and 427 parts deionized water. The reaction mixture is stirred for 5 minutes, then 300 parts deionized water is added. The reaction mixture is stirred for 5 minutes, then 30 parts 2-butoxyethanol is added. The reaction mixture is stirred for 25 minutes, then 501 parts deionized water is added. The reaction mixture is stirred, then 4.4 parts glacial acetic acid is added. The reaction mixture is then stirred to produce an amino oxide modified resin dispersion.

A first electrodeposition bath is prepared by admixing 1333 parts of the above amine oxide modified resin dispersion, and, with good mixing, 1333 parts deionized water.

Films are electrodeposited on individual steel panel cathodes by applying a DC potential of 250 volts between the cathode and an anode for 2 minutes in the above first electrodeposition bath. The coated panels are baked at 176.7° C. for 30 minutes. The type of panel, the thickness of the deposited film and the appearance after baking are shown in Table I.

TABLE I

| Substrate[1] | Film Thickness, millimeters | Appearance After Baking |
|---|---|---|
| A | 0.0406 | glossy |
| B | 0.0330 | glossy |

[1] A = bare steel
B = zinc phosphated steel with chromic acid rinse

A second electrodeposition bath is prepared by admixing 270 parts of the above black paste and the above first electrodeposition bath.

Films are electrodeposited on individual steel panel cathodes by applying a DC potential of 300 volts between the cathode and an anode for 2 minutes in the above second electrodeposition bath. The coated panels are baked at 176.7° C. for 30 minutes and the appearance of the coating is observed. The coated panels are scribed to bare metal with a line running parallel to and about midway between the long sides of the panel and exposed to a salt spray (5 percent aqueous sodium chloride) at 37.8° C. for 336 hours. At the end of that time the coated panels are rubbed with moderate force to remove any coating that has become loosened from the panel. Near the bottom of the scribe line the distance from the scribe line that the coating is removed is measured; this distance is termed "scribe creepage". The coatings of the salt-sprayed panels are then evaluated for adhesion by overall observation. The type of panel, the thickness of the deposited film, the appearance after baking, the scribe creepage and the adhesion of the various coating panels are shown in Table II.

TABLE II

| Substrate[1] | Film Thickness, millimeters | Appearance After Baking | Scribe Creepage millimeters | Adhesion |
|---|---|---|---|---|
| A | 0.0246 | smooth | 0.79 | excellent |
| B | 0.0213 | smooth | 0 | excellent |
| C | 0.0231 | smooth | 0 | excellent |

[1] A = bare steel
B = zinc phosphated steel with chromic acid rinse
C = zinc phosphated steel without chromic acid rinse

EXAMPLE II

A reactor equipped with an agitator, a heater, a thermometer, a condenser set for azeotropic distillation and a source of nitrogen is charged with 930 parts bisphenol A-diglycidyl ether (Epon 1001; Shell Chemical Company) and 50 parts xylene. A nitrogen blanket is applied and the heater is turned on. One hour and 15 minutes later the temperature is 210° C. and 2.8 parts water has been removed. Over a period of 32 minutes the reaction mixture is cooled to 110° C. There are then added 124.7 parts 2-ethoxyethanol and 101 parts cocoamine (Armeen CD; Armak Company). Over a period of 7 minutes the temperature is raised to 130° C. and held at that temperature for 21 minutes. There are then added 88.5 parts of the diketimine solution of Example 1 and 53.2 parts N-methylethanolamine. One minute later the temperature is 142° C. Over a period of 13 minutes the reaction mixture is cooled to 120° C. and held at temperatures in the range of from 120° C. to 123° C. for 34 minutes. There is then added 80 parts 2-hexoxyethanol. Sixteen minutes later the temperature is 100° C. and 10 parts deionized water is added. Five minutes later the temperature is 95° C. and 32.8 parts of 30 percent aqueous hydrogen peroxide is added. The temperature rises to 101° C. Thirty minutes after addition of the aqueous hydrogen peroxide, the temperature is 95° C. and the resulting amine oxide modified resin composition is poured into a container.

A first intermediate is prepared by admixing 383 parts of the above amine oxide modified resin composition and 106.3 parts of the polyurethane curing agent solution of Example I and heating in an oven.

A second intermediate is prepared by admixing 142 parts deionized water, 9.3 parts of the surfactant solution of Example I, 4.5 parts glacial acetic acid and 32.7 parts of the grinding vehicle composition of Example I.

A first electrodeposition bath is prepared by adding 489.3 parts of the above first intermediate composition to 188.5 parts of the above second intermediate composition and then adding, with good mixing, 1606 parts deionized water.

Films are electrodeposited on individual steel panel cathodes by applying a DC potential of 200 volts between the cathode and an anode for 2 minutes in the above first electrodeposition bath. The coated panels are baked at 176.7° C. for 30 minutes. The type of panel, the thickness of the deposited film and the appearance after baking are shown in Table III.

TABLE III

| Substrate[1] | Film Thickness, millimeters | Appearance After Baking |
|---|---|---|
| A | 0.0249 | glossy |
| B | 0.0196 | glossy |

[1]A = bare steel
B = zinc phosphated steel with chromic acid rinse

A second electrodeposition bath is prepared by admixing 267 parts of the black paste of Example I and the above first electrodeposition bath.

Films are electrodeposited on individual steel panel cathodes by applying a DC potential between the cathode and an anode for 2 minutes in the above second electrodeposition bath. The coated panels are baked at 176.7 for 30 minutes and the appearance of the coating is observed. The coated panels are then exposed to salt spray for 336 hours and evaluated for scribe creepage and adhesion in the manner described in Example I. The type of panel, the potential applied during electrodeposition and the observed results are shown in Table IV.

TABLE IV

| Substrate[1] | Applied Potential, volts | Film Thickness, millimeters | Appearance After Baking | Scribe Creepage, millimeters | Adhesion |
|---|---|---|---|---|---|
| A | 200 | 0.0165 | smooth | 1.59 | very good |
| B | 200 | 0.0112 | smooth | 0 | excellent |
| C | 200 | 0.0119 | smooth | 0 | excellent |
| B | 350 | 0.0203 | smooth | 0 | excellent |

[1]Same abbreviations as Table II

EXAMPLE III

A nitrogen atmosphere is established in a reactor equipped with an agitator, a heater, a cooler, a thermometer, a total reflux condenser and a source of nitrogen. The reactor is then charged with 2352 parts aliphatic triisocyanate (L-2291; Mobay Chemical Corp). The addition of 1192 parts methyl ethyl ketoxime is then begun. At the time of beginning the addition, the temperature of the charge is 18° C. The rate of addition is controlled so that the temperature of the reaction mixture remains below 80° C. with cooling applied. The addition is completed after a period of 5 hours and 50 minutes. The temperature of the reaction mixture upon completion of the addition is 79° C. Over a period of 40 minutes the reaction mixture is heated to 99° C. The reaction mixture is then held at 99° C. for 3 hours. At the conclusion of this time the reaction mixture is cooled to 66° C. and held at this temperature. Twelve hours later cooling is applied and the addition of 886 parts of 2-ethoxyethanol is begun. Twenty minutes later the addition is completed and the temperature is 60° C. The resulting blocked aliphatic polyisocyanate solution is placed into containers.

An additive composition is prepared by admixing 812.5 grams methyl methacrylate, 662.5 grams ethyl acrylate, 375 grams styrene, 375 grams 2-hydroxyethyl acrylate, 275 grams 3-(dimethylamino)propyl methacrylamide, 37.5 grams, α,α'-azobisisobutyronitrile and 75 grams tertiary-docecylmercaptan.

A reactor equipped with an agitator, a heater, a thermometer, a total reflux condenser and a source of nitrogen is charged with 573 grams 2-ethoxyethanol and 32 grams deionized water. A nitrogen blanket is applied and the charged materials are heated to 97° C. and then 250 milliliters of the above additive composition is added and the nitrogen is turned off. Thirty minutes later the temperature is 112° C. Over a period of 2 hours and 20 minutes the remainder of the additive composition is added. The temperature of the reaction mixture is then held in the range of from 117° C. to 119° C. for one hour after which 2.5 grams α,α'-azobisisobutyronitrile is added. One hour later the temperature is 107° C. and 100 grams 2-ethoxyethanol is added. One hour and 20 minutes later the temperature is 98° C. There is then added 2.5 grams 2,6-di-tert-butyl-4-methylphenol to produce an intermediate acrylic resin composition.

A reactor equipped with an agitator, a heater, a thermometer and a total reflux condenser is charged with 705.8 parts of the above intermediate acrylic resin composition and heated. When the temperature is 82° C., the addition of 73.3 parts of 30 percent aqueous hydrogen peroxide is begun. Fifteen minutes later the temperature is 85° C. and the addition is completed. After a further period of one hour, the temperature is 82° C., 50 parts 2-phenoxyethanol is added and the reaction mixture is cooled. There is then added 165 parts of the above blocked aliphatic polyisocyanate solution to produce a first amine oxide modified acrylic resin composition.

A thinning composition is formed by admixing 8.9 parts tetramethyldecynediol (Surfynol 104; Air Products & Chemicals Inc.), 35.8 parts 2-phenoxyethanol, 8.0 parts glacial acetic acid and 504.9 parts deionized water. There is then added to the thinning composition 825.0 parts of the above amine oxide modified acrylic resin composition and 900 parts deionized water to produce a second amine oxide modified acrylic resin composition.

EXAMPLE IV

A reactor equipped with an agitator, a heater, a thermometer and a total reflux condenser is charged with 705.8 parts of the intermediate acrylic resin composition of Example III and heated. When the temperature is 80° C., the addition of 18.3 parts of 30 percent aqueous hydrogen peroxide is begun. Thirty minutes later the temperature is 87° C. and the addition is completed. There is then added 152.2 parts of the blocked aliphatic polyisocyanate solution of Example III to produce a first amine oxide modified acrylic resin composition.

A thinning composition is formed by admixing 8.2 parts tetramethyldecynediol, 79.1 parts 2-phenoxyethanol, 7.5 parts glacial acetic acid and 532.1 parts deionized water. There is then added to the thinning composition 647.8 parts of the above amine oxide modified acrylic resin composition and 800 parts deionized water to produce a second amine oxide modified acrylic resin composition.

A chartreuse pigment paste is prepared by admixing 317.4 parts of the grinding vehicle composition of Example I, 126.9 parts deionized water, 246.4 parts azo yellow pigment (Permanent Yellow FGL 11-3012; American Hoechst Corporation), 85.4 parts titanium dioxide pigment, 17.8 parts phthalocyanine blue pigment, 6 parts carbon black and 400.0 parts deionized water.

An electrodeposition bath is prepared by admixing 515.1 parts of the above second amine oxide modified acrylic resin composition, 0.5 part stannous octoate, 55.2 parts of the above chartreuse pigment paste and 1229.2 parts deionized water.

Films are electrodeposited on individual steel panel cathodes by applying a DC potential of 140 volts between the cathode and an anode for 1½ minutes in the above electrodeposition bath. The coated panels are baked at 135° C. for 20 minutes and the appearances of the coatings are observed. The baked panels are scribed with an "X" to bare metal and exposed to a salt spray (5 percent aqueous sodium chloride) at 37.8° C. for various periods of time. At the end of each period the coated panels are rubbed with moderate force to remove any coating that has become loosened from the panels. Near the bottom of one of the scribe lines the distance from the scribe line that the coating was removed is measured. A similar measurement is made on the other side of same scribe line. Both distances are added together to obtain "total scribe lift". The type of panel, the thickness of the deposited film, the appearance after baking, the cumulative salt spray exposure time, abbreviated "CSSET", and the total scribe lift are shown in Table V.

TABLE V

| Substrate[1] | Film Thickness, millimeters | Appearance After Baking | CSSET, hours | Total Scribe Lift, millimeters |
|---|---|---|---|---|
| A | 0.0356 | orange peel | 96 | 10 |
|   |   |   | 168 | 19 |
|   |   |   | 250 | 15 |
| B | 0.0330 | orange peel | 96 | 4 |
|   |   |   | 168 | 11 |
|   |   |   | 250 | 16 |
| C | 0.0330 | orange peel | 96 | 4 |
|   |   |   | 168 | 11 |
|   |   |   | 250 | 20 |

[1] A = calcium modified zinc phosphated steel with chromic acid rinse
B = zinc phosphated steel with chromic acid rinse
C = zinc phosphated steel without chromic acid rinse

EXAMPLE V

A reactor equipped with an agitator and a total reflux condenser is charged with 168 grams methyl methacrylate, 138 grams butyl methacrylate, 73 grams ethylhexyl acrylate, 100 grams 2-(dimethylamino)ethyl methacrylate, 261 grams 4-methoxy-4-methylpentanone-2 (Pent-Oxone, Shell Chemical Co.), 17 grams α,α'-azobis-(isobutyronitrile) and 5 grams tertiary-dodecyl mercaptan. The charged materials are heated to 75° C. The exotherm is carefully controlled by intermittent cooling with an ice water bath while allowing the temperature to slowly rise to 95° C. The temperature is then raised to 100° C. and held at 100° C. for about 2 hours after which the resulting intermediate tertiary amine functional acrylic polymer solution is cooled to room temperature.

While holding the above intermediate tertiary amine functional acrylic polymer solution at temperatures in the range of from 30° C. to 35° C., 60 cubic centimeters of an aqueous hydrogen peroxide solution, containing from 30 to 35 percent hydrogen peroxide, is added dropwise with vigorous agitation over a period of one hour to produce a white emulsion. The reaction mixture is then stirred at temperatures in the range of from 40° C. to 45° C. for 3 hours. Stirring is continued over night at room temperature to produce an amine oxide functional acrylic polymer composition.

A sample of the above amine oxide functional acrylic polymer composition is diluted to 10 percent total solids with water and a small amount of 2-ethoxyethanol to form an electrodeposition bath which, on standing, appears as a clear solution. A DC potential of 250 volts is applied to the electrodeposition bath through a steel anode and a steel cathode to deposit a heavy, cloudy film on the cathode. Baking for 10 minutes at 177° C. produces a glossy, slightly yellow film.

I claim:
1. In a method of electrocoating a conductive substrate serving as a cathode, which method comprises passing an electric current between an anode and said cathode in electrical contact with a water-dispersed composition, the improvement wherein said water-dispersed composition comprises cathodically electrodepositable polymer having tertiary amine oxide groups.
2. The method of claim 1 wherein said cathodically electrodepositable polymer is an acrylic polymer.

* * * * *